United States Patent
Sharma

(10) Patent No.: US 11,286,170 B2
(45) Date of Patent: *Mar. 29, 2022

(54) PROCESSING OF LITHIUM CONTAINING MATERIAL INCLUDING HCL SPARGE

(71) Applicant: Reed Advanced Materials Pty Ltd, West Perth (AU)

(72) Inventor: Yatendra Sharma, Hillarys (AU)

(73) Assignee: Reed Advanced Materials Pty Ltd, West Perth (AU)

(*) Notice: Subject to any disclaimer, the term of this patent is extended or adjusted under 35 U.S.C. 154(b) by 406 days.

This patent is subject to a terminal disclaimer.

(21) Appl. No.: 15/546,560

(22) PCT Filed: Oct. 30, 2015

(86) PCT No.: PCT/AU2015/000650
§ 371 (c)(1),
(2) Date: Jul. 26, 2017

(87) PCT Pub. No.: WO2016/119003
PCT Pub. Date: Aug. 4, 2016

(65) Prior Publication Data
US 2018/0016153 A1 Jan. 18, 2018

(30) Foreign Application Priority Data

Jan. 27, 2015 (AU) ............... 2015900222

(51) Int. Cl.
*C01D 15/02* (2006.01)
*C01D 15/08* (2006.01)
(Continued)

(52) U.S. Cl.
CPC ............ *C01D 15/02* (2013.01); *C01D 15/04* (2013.01); *C01D 15/08* (2013.01); *C22B 3/10* (2013.01);
(Continued)

(58) Field of Classification Search
CPC .......... C01D 7/07; C01D 15/02; C01D 15/04; C01D 15/08; C25B 1/16
See application file for complete search history.

(56) References Cited

U.S. PATENT DOCUMENTS 2,803,518 A * 8/1957 Reader .................... C22B 26/12
423/181
3,202,477 A * 8/1965 Loeffler, Jr. .............. C01D 7/07
423/421
(Continued)

FOREIGN PATENT DOCUMENTS

AU 2013201833 A1 2/2014
CN 102167369 A 8/2011
(Continued)

OTHER PUBLICATIONS

E.G. Noble et al. "Solubilities of Chloride Salts of Alkali and Alkaline-Earth Metals When Sparged with Hydrogen Chloride" US Dept of the Interior, Bureau of Mines Report of Investigations (RI 8991); 1985 (Year: 1985).*

(Continued)

*Primary Examiner* — Salil Jain
(74) *Attorney, Agent, or Firm* — Clements Bernard Walker; Christopher L. Bernard; Christine Wilkes Beninati

(57) ABSTRACT

A process (10) for the treatment of a lithium containing material (12), the process comprising the steps of:
(i) Preparing a process solution from the lithium containing material (12);
(ii) Passing the process solution from step (i) to a series of impurity removal steps, one of which is an HCl sparging step 58, thereby providing a substantially purified lithium chloride solution; and
(iii) Passing the purified lithium chloride solution of step (ii) to an electrolysis step (70) thereby producing a lithium hydroxide solution.

(Continued)

An additional step in which the lithium hydroxide solution produced in step (iii) is carbonated by passing compressed carbon dioxide (88) through the solution, thereby producing a lithium carbonate precipitate, is also disclosed.

16 Claims, 2 Drawing Sheets

(51) Int. Cl.
*C22B 3/10* (2006.01)
*C22B 26/12* (2006.01)
*C22B 3/44* (2006.01)
*C01D 15/04* (2006.01)

(52) U.S. Cl.
CPC ............... *C22B 3/44* (2013.01); *C22B 26/12* (2013.01); *Y02P 10/20* (2015.11)

(56) References Cited

U.S. PATENT DOCUMENTS

| | | | |
|---|---|---|---|
| 3,278,260 A * | 10/1966 | Hermann | C01D 15/04 423/179.5 |
| 4,036,713 A | 7/1977 | Brown | |
| 10,167,531 B2 * | 1/2019 | Sharma | C01B 7/012 |
| 2011/0044882 A1 * | 2/2011 | Buckley | C01B 7/012 423/481 |

FOREIGN PATENT DOCUMENTS

| | | |
|---|---|---|
| WO | 2009/131628 A1 | 10/2009 |
| WO | 2013138900 A1 | 9/2013 |
| WO | 2014/026217 A1 | 2/2014 |
| WO | 2014026217 A1 | 2/2014 |

OTHER PUBLICATIONS

Reed Resources Ltd. "Successful production of Battery Grade Lithium Hydroxide from Mt Marion spodumene" Dec. 2, 2013 (Year: 2013).*
Reed Resources Ltd. "Mt Marion Lithium Update" Oct. 17, 2012 (Year: 2012).*
Neometals. "Mt Marion—Breakthrough test work results" <https://www.neometals.com.au/announce-blog.php?id=808&projpg=mtmar> Dec. 12, 2013 (Year: 2013).*
L.E. Schultze et al. "Recovering Lithium Chloride from a Geothermal Brine" US Dept of the Interior, Bureau of Mines Report of Investigations (RI 8883); 1984 (Year: 1984).*
Nobel et al, Solubilities of Chloride Salts of Alkali and Alkaline-Earth Metals when Sparged with Hydrogen Chloride, Bureau of Mines Report of Investigations, RI 8991, U.S. Department of Interior (Year: 1985).*
International Search Report for International Application No. PCT/AU2015/000650 dated Nov. 23, 2015.
International Search Report for International Application No. 15879276 dated Jun. 25, 2018.
China National Intellectual Property Administration, First Office Action Based on Application No. 201580078156.4 dated Oct. 8, 2018.
Aug. 6, 2019 English Translation of Office Action of Japan Patent Application No. 2017557234.

* cited by examiner

PROCESSING OF LITHIUM CONTAINING MATERIAL INCLUDING HCL SPARGE

FIELD OF THE INVENTION

The present invention relates to the treatment of lithium containing material.

More particularly, the present invention relates to a process for the treatment of a lithium containing material and the production of lithium hydroxide and/or lithium carbonate, wherein an HCl sparge is utilised as an impurity removal step. The process utilises the electrolysis of a lithium chloride solution. In one form, the process of the present invention is intended to provide a high purity or battery grade lithium hydroxide and lithium carbonate product.

The process of the present invention may further provide a hydrochloric acid product. Further, the process of the present invention, in one form, utilises precious metal containing mixed metal oxide (MMO) electrodes to heighten the efficiency of an electrochemical portion of the process. Still further, the use of the HCl sparge as an impurity removal step is believed to provide benefits when compared with other impurity removal methods.

BACKGROUND ART

Known processes for the production of lithium carbonate from lithium containing ores or concentrates typically utilise the thermal treatment of an alpha-spodumene ore or concentrate. This thermal treatment can be referred as decrepitation and transforms the alpha-spodumene to beta-spodumene which is in turn able to be solubilised by acid. The step in which the beta-spodumene is solubilised in acid takes place in a kiln and produces soluble lithium salt. The lithium salt is passed to one or more tanks in which the lithium salt is purified. Leached crude lithium salt is subsequently passed to a step in which the pH of the slurry is adjusted, whereby certain impurities, including iron and magnesium are intended to be precipitated. Thus purified lithium salt is treated with soda ash to produce lithium carbonate. This lithium carbonate can be further treated with hydrated lime to produce lithium hydroxide.

Processes for the production of lithium carbonate and lithium hydroxide from brines typically involves the use of evaporation ponds to increase the concentration of the salts contained therein before being passed to a series of steps aimed to reduce the impurities present.

The above described processes of the prior art are relatively inefficient in the removal of impurities remaining in the pregnant leach solution, which results in a relatively impure lithium hydroxide and lithium carbonate product. This is particularly problematic when attempting to produce high quality or battery grade lithium hydroxide and lithium carbonate products.

The Applicant has previously developed a process for the production of lithium hydroxide and lithium carbonate as described in International Patent Application PCT/AU2013/000857 (WO 2014/026217). Whilst being beneficial when compared with the prior art, the process described therein utilises a concentration step and a fractional crystallisation step for the removal of sodium and potassium impurities, prior to a further ion exchange step for the removal of remaining multivalent cations. The concentration step is problematic, utilising a solvent extraction method, using isopropanol to extract lithium chloride, leaving sodium and potassium behind to be filtered out. The isopropanol then needs to be distilled off, leaving a substantially pure 99.9% lithium chloride solution. Such a concentration step suffers from the relatively high cost of reagents and their flammability.

The process of the present invention has as one object thereof to overcome substantially one or more of the above mentioned problems associated with prior art processes, including those of the Applicant, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The term "battery grade lithium carbonate" refers to a product having a purity of about 99.5% or higher. Similarly, the term "battery grade lithium hydroxide" refers to a product having a purity of about 99% or higher.

DISCLOSURE OF THE INVENTION

In accordance with the present invention there is provided a process for the treatment of a lithium containing material, the process comprising the steps of:
  (i) Preparing a process solution from the lithium containing material;
  (ii) Passing the process solution from step (i) to a series of impurity removal steps, one of which is an HCl sparging step, thereby providing a substantially purified lithium chloride solution; and
  (iii) Passing the purified lithium chloride solution of step (ii) to an electrolysis step thereby producing a lithium hydroxide solution,
wherein the process solution is not subjected to a concentration step prior to the series of impurity removal steps of step (ii).

In one form of the present invention, the lithium hydroxide solution produced in step (iii) is carbonated by passing compressed carbon dioxide through the solution, thereby producing a lithium carbonate precipitate.

Preferably, the process solution of step (i) is prepared in the form of a pregnant leach solution. Still preferably, the pregnant leach solution is formed by passing a lithium containing material to a leach step in which the material is leached with hydrochloric acid.

In a further form, the lithium containing material is an alpha-spodumene ore or ore concentrate and the process further comprises a first step in which that alpha-spodumene ore or ore concentrate is calcined to produce beta-spodumene.

Preferably, the HCl sparging step of step (ii) comprises the sparging of HCl gas into the process solution whereby the HCl concentration thereof increases to a point at which a substantial proportion of any sodium and potassium present precipitates. The HCl concentration of the process solution is preferably increased to at least about 30% w/w, still preferably to at least about 36% w/w.

Still preferably, the HCl sparging step is followed by a filtration step to remove the precipitated sodium and potassium, preferably in the form of a precipitated salt.

Still further preferably, the HCl sparging and filtration steps are followed by an HCl recovery step. The HCl recovery step may be provided in the form of a distillation.

The lithium hydroxide solution produced in step (iii) may be thickened by evaporation of water to provide lithium hydroxide monohydrate crystals.

In a still further form of the present invention a first portion of the lithium hydroxide solution produced in step (iii) is thickened by evaporation/crystallisation to provide lithium hydroxide monohydrate crystals and a second portion thereof is carbonated by passing compressed carbon dioxide through the solution, thereby producing a lithium carbonate precipitate.

Preferably, the impurity removal steps of step (ii) further include one or more of hydropyrolysis of Al and Fe chlorides, pH increase to precipitate hydroxides of Al, Fe, Mg and Mn, and lithium carbonate precipitation for removal of Ca.

The impurity removal steps preferably further comprises an ion exchange step. Preferably, the ion exchange step removes substantially all calcium, magnesium and other multivalent cations remaining in the pregnant leach solution. Still preferably, such multivalent cations are removed to a level of less than about 10 ppm.

Preferably, the beta-spodumene is cooled and milled prior to the leach step. The beta-spodumene is preferably milled to less than about 300 μm. Still preferably, the beta-spodumene is milled to a $P_{80}$ of about 75 μm.

Preferably, the leach step is conducted at elevated temperature.

The hydrochloric acid solution used in the leach step is preferably about 20% HCl w/w.

Still preferably, the elevated temperature of the leach step is about the boiling point of the hydrochloric acid solution used in the leach step.

The leach step is preferably conducted at atmospheric pressure.

In one form of the present invention the leach step is conducted in a chlorination kiln at about 108° C. over a residence time of about 6 to 10 hours. Preferably, the residence time is about 8 hours.

BRIEF DESCRIPTION OF THE DRAWINGS

The process of the present invention will now be described, by way of example only, with reference to one embodiment thereof and the accompanying drawing, in which.

BEST MODE(S) FOR CARRYING OUT THE INVENTION

Figure 1:
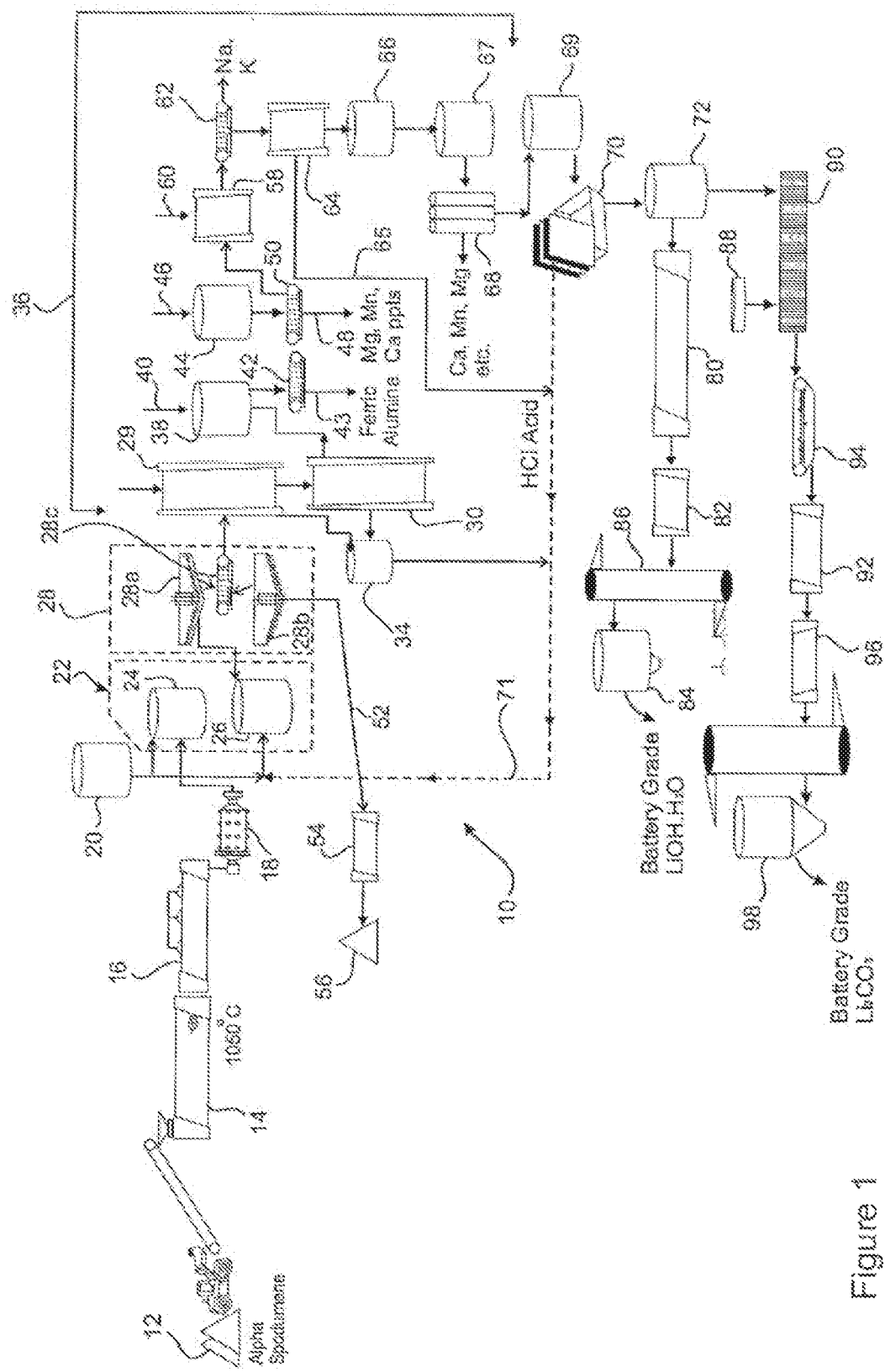
FIG. 1 is a schematic flow-sheet depicting a process for the treatment of a lithium containing material in accordance with a first embodiment of the present invention in which the lithium containing material is an alpha-spodumene concentrate.

In FIG. 1 there is shown a process 10 for the treatment of a lithium containing material in accordance with a first embodiment of the present invention in which embodiment the lithium containing material is provided in the form of an alpha-spodumene concentrate.

All of the unit operations embodied in the process 10 are intended to operate continuously with full process instrumentation and control being provided for.

An alpha-spodumene concentrate 12 is passed to a calcining step in which the concentrate 12 is calcined in a calcining furnace 14 at a temperature of between about 1050° C. to 1100° C., for about 0.5 hours, to convert the alpha-spodumene to leachable beta-spodumene. Off-gases from the calciner are directed through a cyclone (not shown) and an electrostatic precipitator (not shown) specified to comply with known environmental emissions limits. The resulting hot calcine is passed to a cooler 16 and indirectly cooled to about 80° C. It is then dry-milled to less than 300 μm, for example to a $P_{80}$ of about 212 μm, in a mill, for example a closed circuit ball mill 18.

After storage in a surge bin (not shown), the milled beta-spodumene is mixed with at least a 40 to 300% stoichiometric excess of 20% w/w hydrochloric acid 20 in a slurrying step. The slurrying step feeds a leach step, for example a leach circuit 22, comprising a first leach stage 24 and a second leach stage 26.

The leach step is conducted at about 106° C., being the boiling point of the hydrochloric acid leach solution added in the slurrying step, for a period of about 6 to 12 hours, for example about 8 hours, in continuous leach tanks. A pulp density of about 40% is used in the leach circuit 22 to maximise the leach concentration and to ensure that the solubility limit of lithium chloride during leaching is not exceeded. Off-gases are cleaned in a wet scrubber (not shown). The leach step 22 produces a residue slurry and a process solution, for example a pregnant leach solution. The lithium and the aluminosilicate in the beta-spodumene leaches into solution with other impurities to give a sub-saturated concentration of lithium chloride in the pregnant leach liquor.

The pregnant leach solution from the leach circuit 22 is passed to a thickening circuit 28, preferably comprising two stages 28a and 28b aligned with the stages 24 and 26 of the leach circuit 22. An overflow from the thickening circuit 28 is directed to a belt filter 28c and in turn the pregnant leach solution is directed first to distillation step 29, in which excess HCl is recovered, and second to a pyrohydrolysis step 30, operating at about 300° C., and in which chlorides of Al and Fe present in the pregnant leach solution, for example $AlCl_3.6H_2O$ and $FeCl_3.6H_2O$, are converted into their respective insoluble oxides 32. Any residual HCl is also recovered from pyrohydrolysis to a HCl tank 34.

In addition to the Al and Fe described immediately above as being recovered using the pyrohydrolysis step 30, remaining soluble iron, aluminium and magnesium are removed in large part from the leach liquor through a series of impurity removal steps, indicated in a broad sense by impurity removal steps 36 in FIG. 1. The impurity removal steps 36 further include a pH modification step 38 through the addition of LiOH 40 to raise the pH to about 9. The product of step 38 is passed to a belt filter 42 from which Al, Fe, Mn and Mg containing precipitates 43 are recovered. The impurity removal steps 36 further include a calcium precipitation step 44 with the addition of either sodium carbonate (soda ash) or lithium carbonate 46 and oxalate, producing a magnesium, manganese and/or calcium containing precipitate 48 from a further belt filter 50.

A thickener underflow product 52 of the second thickening step 28b is passed to a drying step 54 before passing to waste 56 and subsequent disposal.

The liquid product of the belt filter 50, being largely LiCl solution having as its major contaminants sodium and potassium, is passed to an HCl sparging step 58 in which HCl gas 60 is sparged into the LiCl solution. By way of the 'common ion effect' this sparging with HCl gas allows an HCl concentration of greater than 30% w/w, for example 36% w/w, to be achieved. At this concentration of HCl any NaCl and/or KCl present have near zero solubility, allowing such to be removed in a filtration step, utilising for example a belt filter 62.

The liquid product of the belt filter 56 is in turn passed to a distillation step 64 for the recovery of HCl gas 65 through distillation at about 106° C. The distillation step 64 provides pure LiCl crystals 66 that are in turn dissolved in water to provide a LiCl solution 67 having a LiCl concentration of about 35% w/w.

After the removal of substantially all impurities as described above, the lithium chloride solution 67 is passed through an ion exchange step 68, comprising an Ion Exchange (IX) column by which substantially all of any residual calcium, manganese, magnesium and other multi-valent cations are removed to a level of less than about 10 ppm, for example 1 ppm.

The further purified lithium chloride solution is first stored 69 and then heated to 90° C. and pumped to an electrolysis step 70 comprising a number of electrolysers, for example 6 to 20 electrolysers, in which lithium chloride and water are consumed to produce lithium hydroxide, chlorine and hydrogen.

After passing through the electrolysers, the weak or depleted lithium chloride solution contains dissolved chlorine gas. Before this weak lithium chloride solution is recycled to the slurrying step immediately prior to the leach circuit 22, the dissolved chlorine is removed in two stages. In a first stage hydrochloric acid is added to the lithium chloride solution to reduce the pH to <5 which forces some of the chlorine gas out of solution. The remaining dissolved chlorine gas is then removed by air stripping the solution (not shown).

Chlorine and hydrogen produced as by-products of the electrolysis step 70 are combined to produce HCl acid which is used in the slurrying step and leaching circuit 22, as is recovered HCl from distillation step 29, pyrohydrolysis step 30 and the distillation step 64. This recycle stream is shown as recycle 71 in FIG. 1.

The lithium hydroxide solution obtained from the electrolysis step 70 is passed firstly to a holding tank 72, from which it can either be (i) evaporated and crystallised to produce lithium hydroxide monohydrate crystals, or (ii) sent to carbonation step to convert into lithium carbonate, as clearly shown in FIG. 1.

In the first of these options, the lithium hydroxide in solution is crystallised in, for example, a vacuum evaporative crystalliser 80 (Oslo type) operating at a temperature of about 80° C. and pressure of about 45 kPa (a). The residence time is about 60 minutes so as to achieve a coarse crystal product. The resulting water vapour is recompressed, combined with make-up steam and used as the heating medium for the crystalliser 80.

Lithium hydroxide crystals are washed by cold water (not shown) achieving a wash efficiency of 99%. The resulting wash solution is recycled back to the leach circuit 22 as noted above. Solids from the centrifuge are fed to an indirect-fired kiln or dryer 82, operating at about 120° C., which dries the crystals. The crystal product, being battery grade LiOH.H$_2$O, is pneumatically conveyed to product bins 84, and cooled to 50° C. in a jacketed screw conveyer 86 as it is conveyed ultimately to bagging stations (not shown).

In the second option noted above, lithium carbonate may be produced by carbonation of lithium hydroxide solution by passing compressed carbon dioxide gas 88 though the solution of lithium hydroxide in a carbonation vessel 90 in which lithium carbonate is precipitated. This slurry is fed to a washer/centrifuge 92 by way of a filter 94, after which wash water is recycled with any remaining lithium hydroxide solution or mother liquor to electrolysis 70. Wet lithium carbonate crystals are fed to a dryer 96 in which hot air is used to dry the crystals. Medium pressure air is used to heat the air. After drying the battery grade lithium carbonate may be micronized to a particle size requested by a customer prior to passing to storage bins 98 and subsequent bagging (not shown).

Condensate throughout the process is used as make-up water for hot process water, cold process water and cooling water. As the process does not return condensate there is an overall positive water balance and about $\frac{1}{10}^{th}$ of the process water is discharged to a sewerage system (not shown).

It is envisaged that tantalite and alumina may also be recovered using the process of the present invention. The filter cake from the thickening step may be discharged to a tantalite recovery plant (not shown). Discharge from the tantalite recovery plant may be fed onto a belt filter to remove water, which is returned to the tantalite recovery plant. The filter does not use washing and has a filtration are of 19 m$^2$. The filter cake from the belt filter is dried in a direct-fired kiln. The dry alumina silicate is cooled to 50° C. in a jacketed screw conveyor and then pneumatically conveyed to a storage bin prior to dispatch.

In accordance with a second embodiment of the present invention the lithium containing material may be provided in the form of a lithium containing brine. Brines do not require the calcining, cooling, milling and leach steps as described for the first embodiment of the present invention but it is envisaged that the remainder of the process will be substantially similar to that of the first embodiment described above.

The process of the present invention may be better understood with reference to the following non-limited example.

EXAMPLE

The process 10 for the treatment of a lithium containing material as described above in accordance with the first embodiment of the present invention, in which the lithium containing material is an alpha-spodumene concentrate, was operated such that immediately prior to the HCl sparging step 58 the LiCl solution had the composition set out in Table 1 below:

TABLE 1

| AlCl$_3$ % w/w | CaCl$_2$ mg/L | FeCl$_3$ mg/L | KCl mg/L | LiCl mg/L | MgCl$_2$ mg/L | MnCl$_2$ mg/L | NaCl mg/L |
|---|---|---|---|---|---|---|---|
| 0.00 | 0.00 | 0.00 | 0.47 | 19.67 | 0.00 | 0.00 | 1.01 |

In the HCl sparging step 58 sufficient HCl gas was sparged into a 20% solution of LiCl having the above composition such that the HCl concentration achieved 36% w/w. This was operated over several temperatures ranging from 20° C. (room temperature) to 60° C. No change in precipitation pattern was noted over this temperature range.

Figure 2:
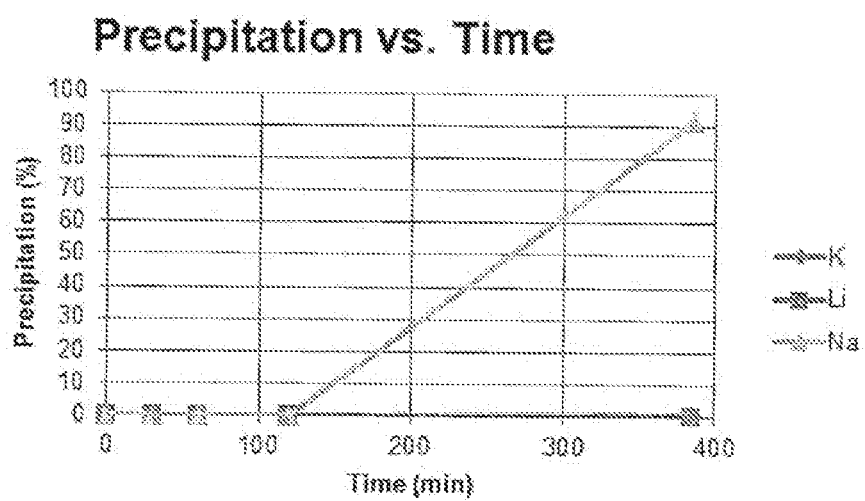
FIG. 2 is a graph representing the precipitation of NaCl from a LiCl solution in an HCl sparging step as used in the process of the present invention and depicted in FIG. 1.

The results of the HCl sparging step 58 are presented in FIG. 2. It is evident from the results that >92% NaCl was precipitated and removed from the LiCl solution. At the same time, no discernible LiCl was precipitated. Also apparent was the inability to precipitate KCl at the given HCl acid sparge conditions and at room temperature. The Applicants expect it will be required to conduct similar testing at lower temperatures, such as close to 0° C. to remove KCl from the LiCl solution. The solubility of KCl decreases tremendously at lower temperatures in presence of HCl acid at 36% w/w strength, and hence it believed to be possible to remove all KCl at lower temperature, such as at or about 0° C.

As can be seen from the above, the process of the present invention provides a process by which a high purity or battery grade lithium hydroxide and lithium carbonate products may be obtained from an alpha-spodumene ore or concentrate, or from a lithium containing brine, whilst also allowing the production of a hydrogen chloride gas product. Further, the process of the present invention overcomes the need for a concentration step and a fractional crystallisation step for the removal of sodium and potassium impurities, prior to the ion exchange step for the removal of remaining multivalent cations. As described hereinabove, the concentration step of the prior art is significantly problematic, utilising a solvent extraction method, using isopropanol to extract lithium chloride, leaving sodium and potassium behind to be filtered out. The isopropanol then needs to be distilled off, leaving a substantially pure 99.9% lithium chloride solution. Such a concentration step suffers from the relatively high cost of reagents and from their flammability. The on-going operation cost of the HCl sparge utilised in the present invention is, as a hydrometallurgical unit operation, lower than that of the prior art method utilising isopropanol. The recovery of HCl acid in the process of the present invention is ideally greater than 99% whilst the recovery of isopropanol in the prior art method is at best 95%.

Modifications and variations such as would be apparent to the skilled addressee are considered to fall within the scope of the present invention. For example, it is envisaged that the leach circuit 22 may comprise only a single leach stage/operation without departing from the scope of the present invention.

The invention claimed is:

1. A process for the treatment of a lithium containing material, the process comprising the steps of:
  (i) Preparing a process solution from the lithium containing material, wherein the lithium containing material is alpha-spodumene and the alpha-spodumene is calcinated to produce beta-spodumene, and
  wherein the process solution is prepared from a pregnant leach solution and the pregnant leach solution is formed by passing the beta-spodumene to a leach step comprising a first leach stage and a second leach stage in which the material is leached with hydrochloric acid to form the pregnant leach solution, and passing the pregnant leach solution to a thickening circuit comprising a first thickening stage aligned subsequent with the first leach stage and a second thickening stage aligned subsequent with the second leach stage and subsequently pyrohydrolysing an overflow from the thickening circuit, thereby converting any chlorides of aluminum and iron into insoluble oxides, wherein an underflow from the first thickening stage aligned subsequent with the first leach stage is passed to the second leach stage, and wherein an underflow from the second thickening stage aligned subsequent with the second leach stage is passed to waste;
  (ii) Passing the process solution from step (i) without a concentration step for removal of sodium and potassium impurities to a series of impurity removal steps, including a first step for removal of multivalent cations of at least one of a) raising pH of the process solution and b) addition of either sodium carbonate or lithium carbonate, and one or more subsequent steps for removal of monovalent cations, one of which is an HCl sparging step for removal of sodium, thereby providing a purified lithium chloride solution and recovered HCl;
  (iii) Passing the purified lithium chloride solution of step (ii) to an ion exchange step that removes remaining calcium and magnesium therefrom; and
  (iv) Passing the purified lithium chloride solution of step (iii) to an electrolysis step, thereby producing a lithium hydroxide solution, chlorine, and hydrogen, the chlorine and hydrogen being combined to provide additional recovered HCl,
  wherein the process solution is not subjected to either the concentration step or a fractional crystallization step prior to any of the series of impurity removal steps of step (ii) and the ion exchange step of step (iii) and the electrolysis step of step (iv),
  wherein the HCl sparging step of step (ii) comprises the sparging of HCl gas into the process solution whereby the HCl concentration thereof increases to a point at which sodium present precipitates and wherein the HCl concentration of the process solution is increased to: (i) at least about 30% w/w; or (ii) at least about 36% w/w; and
  wherein HCl acid is recovered from the HCl sparging step of step (ii) and recycled to step (i).

2. The process according to claim 1, wherein the lithium hydroxide solution produced in step (iv) is carbonated by passing compressed carbon dioxide through the solution, thereby producing a lithium carbonate precipitate.

3. The process according to claim 1, wherein the HCl sparging step is followed by a filtration step to remove any precipitated sodium and potassium.

4. The process according to claim 1, wherein the HCl sparging step is followed by a filtration step to remove any precipitated sodium and potassium, and the HCl sparging and filtration steps are followed by an HCl recovery step.

5. The process according to claim 1, wherein the lithium hydroxide solution produced in step (iv) is thickened by evaporation of water to provide lithium hydroxide monohydrate crystals.

6. The process according to claim 1, wherein a first portion of the lithium hydroxide solution produced in step (iv) is thickened by evaporation/crystallisation producing lithium hydroxide monohydrate crystals, and a second portion thereof is carbonated by passing compressed carbon dioxide through the solution, thereby producing a lithium carbonate precipitate.

7. The process according to claim 1, wherein the impurity removal steps of step (ii) further include one or more of hydropyrolysis of Al and Fe chlorides, pH increase to precipitate hydroxides of Al, Fe, Mg and Mn, and lithium carbonate precipitation for removal of Ca.

8. The process according to claim 7, wherein the ion exchange step removes substantially all multivalent cations in the pregnant leach solution to a level of less than about 10 ppm.

9. The process according to claim 1, wherein the beta-spodumene is milled prior to the first step to a size of:
  (i) less than about 300 μm; or
  (ii) a $P_{80}$ of about 75 μm.

10. The process according to claim 1, wherein a leach step that produces the pregnant leach solution is conducted at elevated temperature.

11. The process according to claim 1, wherein the pregnant leach solution is formed by passing a lithium containing material to a leach step in which the material is leached with hydrochloric acid at 20% HCl w/w.

12. The process according to claim 1, wherein the leach step that produces the pregnant leach solution is conducted at an elevated temperature that is about the boiling point of hydrochloric acid solution used in the leach step, and the leach step is conducted at atmospheric pressure.

13. The process according to claim 1, wherein the leach step that produces the pregnant leach solution is conducted in a chlorination kiln at about 108° C. over a residence time of:
   (i) about 6 to 10 hours; or
   (ii) about 8 hours.

14. The process according to claim 1, wherein the overflow from the thickening circuit is first directed to a belt filter and the pregnant leach solution is then directed to a distillation step in which excess HCl is recovered and then passed to the pyrohydrolysing.

15. The process according to claim 14, wherein the pyrohydrolysing is performed at about 300° C.

16. The process according to claim 15, wherein recovered HCl from the pyrohydrolysing is sent to a HCl tank.

\* \* \* \* \*